Jan. 21, 1936.     R. HOE     2,028,282
POWER UNIT
Filed Jan. 4, 1934    3 Sheets-Sheet 1
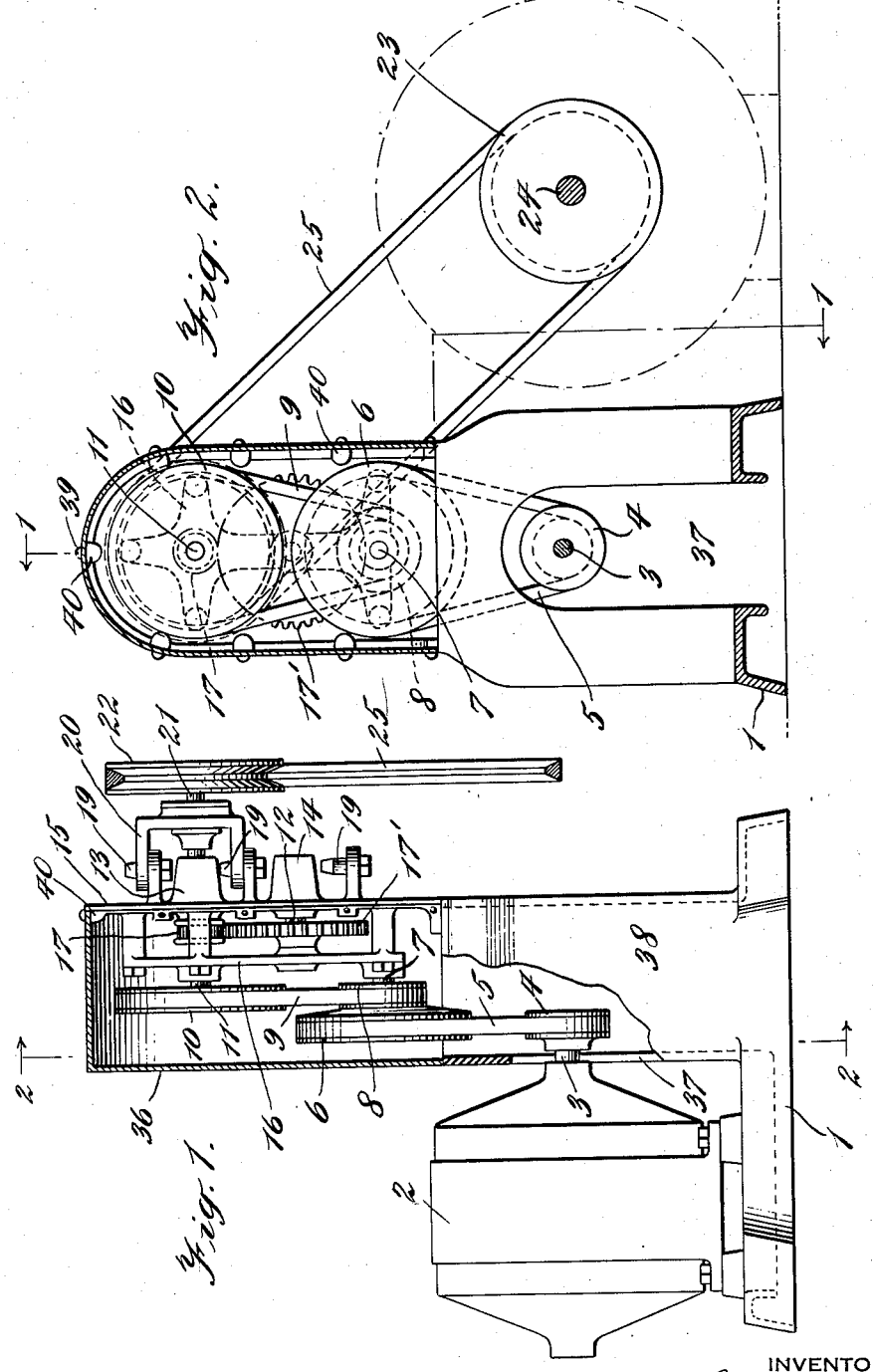
INVENTOR
Robert Hoe
BY
Gifford, Scull & Burgess
ATTORNEYS.

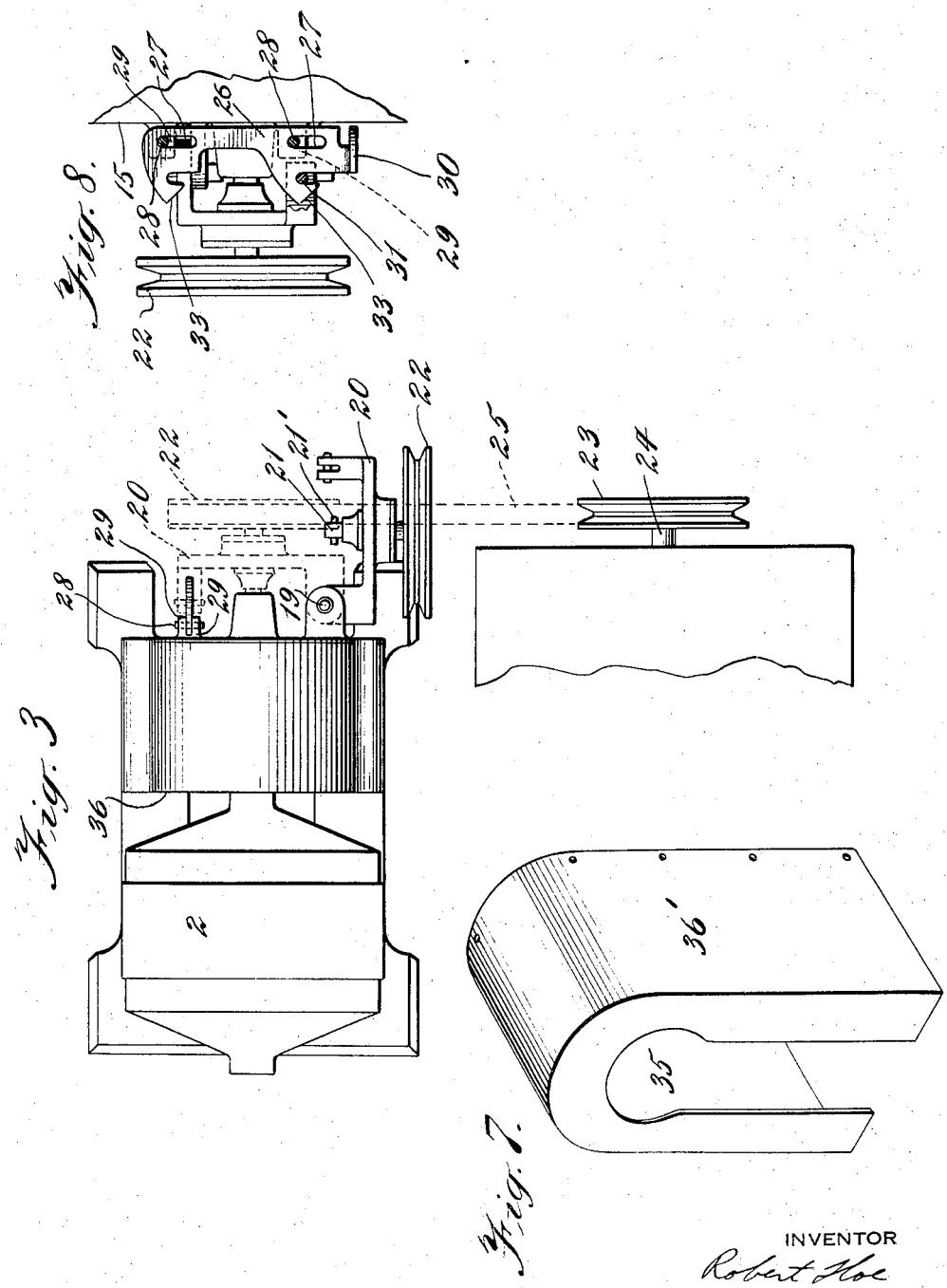

Jan. 21, 1936.　　　　R. HOE　　　　2,028,282
POWER UNIT
Filed Jan. 4, 1934　　　3 Sheets-Sheet 3
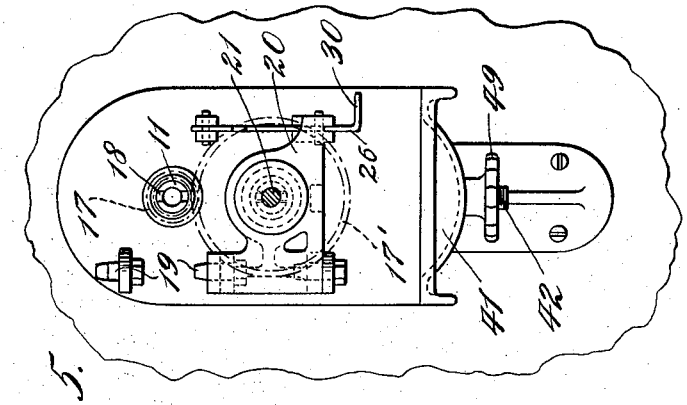
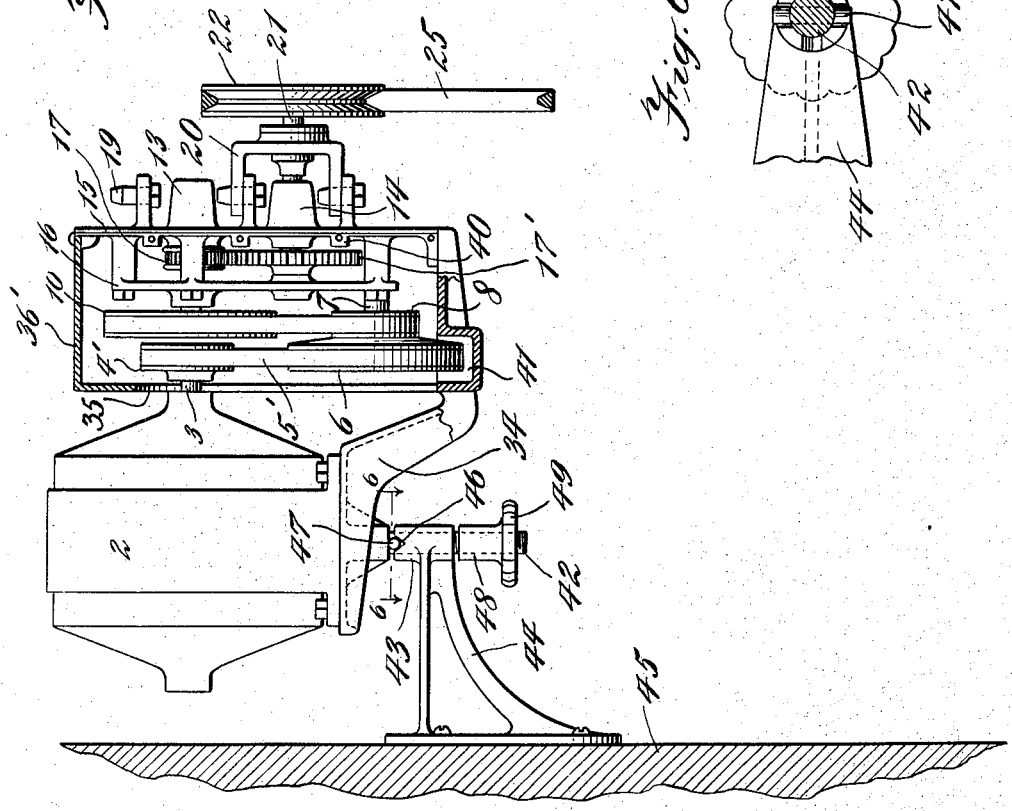
INVENTOR
Robert Hoe
BY
Gifford, Scull & Burgess
ATTORNEYS Patented Jan. 21, 1936

2,028,282

UNITED STATES PATENT OFFICE 2,028,282

POWER UNIT

Robert Hoe, Hyde Park, N. Y.

Application January 4, 1934, Serial No. 705,230

4 Claims. (Cl. 74—16)

This invention relates to a novel and improved form of power unit embodying certain novel features, selected embodiments of which are shown in the accompanying drawings in which:

Fig. 1 is a view partly in elevation and partly in section through one form of power unit, this figure being a view taken approximately on the line 1—1 of Fig. 2.

Fig. 2 is a section taken approximately on the line 2—2 of Fig 1;

Fig. 3 is a plan view of the structure appearing in Figs. 1 and 2;

Fig. 4 is a vertical view, partly in elevation and partly in section, showing a different embodiment of power unit in which the novel features may be incorporated;

Fig. 5 is a face view of the mechanism appearing in Fig. 4 as viewed from the right of that figure;

Fig. 6 is a section on the line 6—6 of Fig. 4;

Fig. 7 is a perspective view of part of the casing appearing in Figs. 4 and 5;

Fig. 8 is a view taken from the right of Fig. 5.

The power unit shown in this application in various forms is a modification of that shown, described, and claimed in my Patent 1,864,304, granted June 21, 1932. In describing the invention to be claimed herein, reference will from time to time be made to that patent.

Referring first to Figs. 1, 2, and 3, the power unit shown therein comprises a base 1 supporting an electric motor 2 operated from any suitable source of electrical energy, which is not shown. This motor comprises a shaft 3 upon which is secured a small-diameter pulley 4 over which runs a belt 5 which also engages a relatively large-diameter pulley 6 on an intermediate shaft 7. This shaft 7 likewise has secured thereto a relatively small-diameter pulley 8 over which runs a belt 9, this belt likewise running over a large-diameter pulley 10 mounted on a shaft 11.

The shaft 11 is one of two driving shafts, the other of which is shown at 12, these two shafts being mounted parallel to each other and having bearings 13 and 14 in the face plate 15 and also in the frame 16. These two shafts 11 and 12 have thereon, respectively, a pinion 17 of relatively small diameter and a gear 17' of relatively large diameter so that the two shafts rotate at different speeds. These two shafts correspond, respectively, to the two shafts 16 and 17 of my aforesaid patent, and the gearing and the manner of supporting the shafts may be the same as shown in the patent. Likewise, each shaft 11 and 12 may be provided at its end with a clutch element, one such clutch element being shown at 18 in Fig. 5.

It will be seen that with the above arrangement a simple and effective drive is provided from the motor shaft 3 to the two shafts 11 and 12. The drive is a quiet one which will transmit the necessary power without the noise oftentimes resulting from the use of gearing, and without the necessity of lubricating such gears to prevent noise. The power unit is one designed primarily for use in homes or in other places where noise is undesirable, and I have found that with the above arrangement the necessary power may be transmitted at the required speed without objectionable noise.

A given electric motor, such as the motor 2, will operate at a certain R. P. M. for the shaft 3 when supplied with current from a given source of power; for example, from the power line in a certain city. When supplied with power from a plant in another city, the R. P. M. delivered by the same motor may be entirely different. My arrangement of belts and pulleys provides a very convenient way of overcoming this difficulty. By changing the relative diameters of the pulleys 6 and 8, for example, the speed of the two shafts 11 and 12 may be maintained constant, no matter what the R. P. M. of the shaft may be. In other words, the shafts 11 and 12 are designed to operate at certain speeds which it is desirable to maintain substantially constant, no matter where the unit may be employed, and by my novel arrangement of belts and pulleys, this result is possible without expensive or cumbersome devices being required. At the same time, the arrangement is extremely compact and simple and unlikely to get out of order.

As more fully explained in my aforesaid patent, the shafts 11 and 12 are designed to operate any one of a plurality of devices, and such devices may be mounted upon two of the three hinge pins 19. When so mounted, the device on the hinge pins is designed to be operated by one of the shafts 11 or 12, and for this purpose is usually provided with a shaft having a clutch element adapted to cooperate with either one of the clutch elements on the shafts 11 and 12.

In the instant case, the device is shown as comprising a frame 20 having a bearing for a driven shaft 21 upon which is mounted a pulley 22. This pulley may be used to drive a pulley 23 mounted on the shaft 24 of any mechanism which it is desired to drive, such, for example, as a churn. The driving is done by a belt 25 running over the two pulleys 22 and 23.

The arrangement just described has several advantages. The unit may be placed conveniently near any mechanism which it is desired to operate, and then the pulley attachment just described may be placed upon two of the hinge pins 19 and at once a mechanism is provided which will operate the shaft 24. The hinged mounting referred to above is particularly of advantage, as will be seen from an inspection of Fig. 3. The frame 20 may be placed in some such position as shown in full lines in that figure, and the belt may be placed over the pulley 23 and in engagement with the groove in the pulley 22. Then the frame 20 may be swung on its hinges into operative position, which is indicated in dotted lines in Fig. 3, in which position the shaft 21 will be clutched to one of the shafts 11 or 12, as the case may be, the clutch pin 21' being adapted to be received in the grooves 18, such as shown in Fig. 5, and which collectively form the clutch element of the driving shaft. As the frame is thus swung into operative position, the belt 25 will be gradually tightened until, when the two shafts are clutched together, the belt will have been brought to the desired tension.

It will be seen that the above arrangement is thus of advantage in providing a drive for a piece of mechanism which it is desired to operate, and at the same time it is possible to place the driving belt in position easily and to the best advantage without the trouble usually experienced in placing a belt over two pulleys which are fixed in position with respect to each other.

When in the position shown in dotted lines in Fig. 3, the frame 20 or in fact any other device which it is intended to operate by one of the shafts 11 or 12 may be conveniently held in position by means of a latch 26 having vertically extending slots 27 therein which engage pins 28 which are in turn supported by ears 29 on the face plate 15. The latch may be lifted by engagement with a thumb piece 30, and there is sufficient play between the walls of the slots 27 and the pins 28 to permit dropping of the latch by its own weight. The device which the latch is designed to hold in operative position may have a pin 31 which is adapted to engage within one of the slots 32, the entire latch being cammed upwardly by engagement of this pin with one of the cam surfaces 33, unless the latch is lifted manually.

The above arrangement of latch is one which is extremely simple and effective in use with the three hinge pin arrangement employed with this unit. The latch is adapted to hold the device in operative relation with either one of the driving shafts 11 or 12, without the use of springs or other relatively complicated mechanism.

Referring now to Figs. 4, 5, and 6, I have shown therein a different form of power unit in which most of the parts shown are identical with those shown and described in Figs. 1, 2, and 3. Certain of such parts have been indicated by numerals but will not be further described, and those not designated by numeral or specifically referred to hereinafter may be assumed to be identical with similar parts shown in Figs. 1, 2, and 3.

In this embodiment, the motor 2 is mounted upon a plate 34 upon which is also mounted the face plate 15. The pulley 4' on the motor shaft 3 is, however, above the pulley 6 instead of below it, as shown in Figs. 1, 2, and 3, and this shaft extends through an opening 35 in the casing 36' which encloses the various parts. In Figs. 1, 2, and 3, the casing 36 is closed and the shaft 3 extends through an opening 37 in a column 38 upon which the face plate and the casing 36 are supported. In both instances, however, the casing may be secured by screws 39 which are received in holes in lugs 40 extending rearwardly from the face plate 15.

In order to supply space, the plate 34 is provided with a recess 41 in which the pulley 6 may rotate as it is turned by the belt 5'. It will be seen that the plate 34 supports the motor 2 directly over a stem 42 which is secured to the plate and which is loosely received in a bore of the vertically extending bearing 43 on the bracket 44, this bracket being adapted to be secured to a wall 45. The wall of the bore has at its upper edge a plurality of recesses 46, here shown as four in number, arranged in pairs, with the two recesses in each pair disposed oppositely each other. These recesses are adapted to receive a pin 47, here shown as extending diametrically through the stem 42 so that its opposite ends may be received in oppositely disposed recesses of a pair. The walls of each recess form cam surfaces so that the pin will tend to ride down to the bottom of each recess and, upon turning of the plate, the pin may ride up on such cam surfaces out of the recesses, unless otherwise prevented from doing so. In order to prevent accidental movement of the plate on the bracket, the lower end of the stem 42 may be threaded to receive a nut 48 provided with a hand wheel 49, which nut will engage the under side of the bearing 43 to prevent the pin 47 from rising out of the recess 46 in which it happens to be resting.

The above arrangement is a particularly advantageous and simple one, in that the weight of the motor and other parts serves to help in locking the pin in a recess while at the same time it is possible to easily turn the entire unit in the bearing 43 upon loosening of the nut 48. By providing a plurality of recesses 46, it is possible to turn the unit to any one of several desired positions. In the particular form illustrated, the unit may be placed in the position shown in Fig. 4 or at right angles thereto by turning it either to the right or to the left.

While I have shown the invention as embodied in specific forms, it is to be understood that various changes in details may be made without departing from the scope of the invention, and I therefore do not intend to limit myself except by the appended claims.

I claim:

1. A power unit comprising a driving shaft having a clutch element on the end thereof, a second driving shaft parallel to the first shaft and likewise having a clutch element on the end thereof, a pinion on the first shaft meshing with a gear on the second shaft whereby said shafts rotate in opposite directions at different speeds, a large-diameter pulley secured to said first shaft, a motor having a shaft parallel to both of said first and second shafts, a shaft intermediate said motor shaft and said first shaft and having a small-diameter pulley in line with the pulley on said first shaft, a belt connecting said pulleys, a small-diameter pulley on said motor shaft, a large-diameter pulley on said intermediate shaft, and a belt connecting said two last-named pulleys.

2. A power unit comprising a driving shaft having a clutch element on the end thereof, a second driving shaft parallel to the first shaft and likewise having a clutch element on the end thereof, a pinion on the first shaft meshing with a gear on the second shaft whereby said shafts rotate in opposite directions at different speeds, a large-diameter pulley secured to said first shaft, a casing enclosing said pinion, gear, and pulley, said driving shafts extending through the face of said casing, a motor disposed at the back of said casing and having a shaft extending through an opening in said back, a small-diameter pulley on said motor shaft within the casing, a shaft intermediate said motor shaft and said first shaft and having a small-diameter pulley in line with the pulley on said first shaft, a belt connecting said two last-named pulleys, a large-diameter pulley on said intermediate shaft in line with the pulley on said motor shaft, and a belt connecting said two last-named pulleys.

3. A power unit comprising a driving shaft having a clutch element on the end thereof, a second driving shaft parallel to the first shaft and likewise having a clutch element on the end thereof, a pinion on the first shaft meshing with a gear on the second shaft whereby said shafts rotate in opposite directions at different speeds, a large-diameter pulley secured to said first shaft, a casing enclosing said pinion, gear, and pulley, said driving shafts extending through the face of said casing, a motor disposed at the back of said casing and having a shaft extending through an opening in said back substantially in line with said first shaft, a small-diameter pulley on said motor shaft within the casing, a shaft intermediate said motor shaft and said first shaft and having a small-diameter pulley in line with the pulley on said first shaft, a belt connecting said two last-named pulleys, a large-diameter pulley on said intermediate shaft in line with the pulley on said motor shaft, and a belt connecting said two last-named pulleys.

4. In combination, a power unit having a driving shaft, a device hinged to said unit and having a driven shaft, said shafts having clutch elements thereon adapted to cooperate to drive the driven shaft from the driving shaft, a pulley secured to said driven shaft, and a mechanism having a pulley thereon disposed in line with the pulley on said device when said driving and driven shafts are clutched together, movement of said device on its hinge to unclutch said shafts being towards said mechanism, whereby such movement will cause a loosening of said belt.

ROBERT HOE.